(12) United States Patent
Shen et al.

(10) Patent No.: US 10,951,801 B2
(45) Date of Patent: Mar. 16, 2021

(54) CAMERA MODULE AND PHOTOSENSITIVE ASSEMBLY THEREOF

(71) Applicant: NANCHANG O-FILM OPTICAL-ELECTRONIC TECH CO., LTD., Nanchang (CN)

(72) Inventors: Chengzhe Shen, Nanchang (CN); Jun Feng, Nanchang (CN); Shumin Zhu, Nanchang (CN); Shengyun Zhang, Nanchang (CN); Wenhua Shuai, Nanchang (CN); Dong Tang, Nanchang (CN)

(73) Assignee: NANCHANG O-FILM OPTICAL-ELECTRONIC TECH CO., LTD., Nanchang (CN)

( * ) Notice: Subject to any disclaimer, the term of this patent is extended or adjusted under 35 U.S.C. 154(b) by 0 days.

(21) Appl. No.: 16/132,295

(22) Filed: Sep. 14, 2018

(65) Prior Publication Data
US 2019/0089882 A1      Mar. 21, 2019

(30) Foreign Application Priority Data

Sep. 15, 2017    (CN) .......................... 201710850429.3

(51) Int. Cl.
*H04N 5/225*            (2006.01)

(52) U.S. Cl.
CPC ......... *H04N 5/2257* (2013.01); *H04N 5/2253* (2013.01); *H04N 5/2254* (2013.01)

(58) Field of Classification Search
CPC .. H04N 5/2257; H04N 5/2253; H04N 5/2254; H04N 5/2251; H01L 27/14632
See application file for complete search history.

(56) References Cited

U.S. PATENT DOCUMENTS

| | | | |
|---|---|---|---|
| 2012/0250293 A1* | 10/2012 | Jeong | ................ G02F 1/133605 362/97.2 |
| 2018/0007244 A1* | 1/2018 | Wang | ................... H04N 5/2252 |
| 2018/0350729 A1* | 12/2018 | Mei | ...................... H01L 23/4985 |
| 2019/0089885 A1* | 3/2019 | Shen | .................... H04N 5/2254 |
| 2019/0148429 A1* | 5/2019 | Wang | ................... H05K 1/0274 |
| 2019/0165019 A1* | 5/2019 | Wang | .................... H04N 5/225 |

\* cited by examiner

*Primary Examiner* — Nhan T Tran
(74) *Attorney, Agent, or Firm* — Franklin & Associates International Inc; Matthew F. Lambrinos (57) ABSTRACT

A photosensitive assembly includes a circuit board, photosensitive chip coupled to the circuit board, the photosensitive chip includes a photosensitive area on an upper surface thereof and a non-photosensitive area surrounding the photosensitive area, and a package body packaged on the circuit board and covering a portion of the non-photosensitive area of the photosensitive chip, the package body includes an inner surface, and the inner surface has a curved surface on an edge thereof contacting the non-photosensitive area.

8 Claims, 6 Drawing Sheets

CAMERA MODULE AND PHOTOSENSITIVE ASSEMBLY THEREOF

CROSS-REFERENCE TO RELATED APPLICATION

This application claims the benefit of Chinese Patent Application No. 2017108504293, filed on Sep. 15, 2017, the entire content of which is incorporated herein in its entirety.

TECHNICAL FIELD

The present disclosure relates to camera technologies, and particularly relates to a camera module and a photosensitive assembly thereof.

BACKGROUND

With the rapid development of various smart devices, smart devices integrated with camera modules are becoming thinner and lighter while improving their camera quality. Improving the camera quality means that that the size of specifications and the number of the electronic elements are increasing, the area of the photosensitive chip that significantly affects the camera quality is also increasing. Therefore, the assembly difficulty and the overall size are increasing, the lightweight and thinness of the camera module are greatly limited, thereby limiting the size of the smart device provided with the camera module.

In a conventional manufacturing process of the camera module, the circuit board, the photosensitive chip, and the like are separately made, the photosensitive chip is glued on the circuit board, and then a package body that is spaced apart from the photosensitive chip is formed via injecting molding process. The package is used to package the electronic elements such as resistors and capacitors on the circuit board. Finally, a lens is located on the package body. The conventional camera module manufactured by the aforementioned process may easily detach the package body from the circuit board due to a collision or a shake of the lens assembly during use.

SUMMARY

According to various embodiments of present disclosure, a camera module and a photosensitive assembly thereof are provided.

A photosensitive assembly includes a circuit board; a photosensitive chip coupled to the circuit board, and the photosensitive chip includes a photosensitive area on its upper surface thereof and a non-photosensitive area surrounding the photosensitive area; and a package body packaged on the circuit board and covering a portion of the non-photosensitive area. The package body includes an inner surface, and the inner surface has a curved surface on an edge of the inner surface contacting the non-photosensitive area.

A camera module includes a circuit board, a photosensitive chip coupled to the circuit board, a package body packaged on the circuit board, and a lens assembly located on a photosensitive path of the photosensitive chip. The photosensitive chip includes a photosensitive area on its upper surface and a non-photosensitive area surrounding the photosensitive area. The package body includes an inner surface, and the inner surface has a curved surface on an edge of the inner surface contacting the non-photosensitive area.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

Embodiments of the present disclosure are described more fully hereinafter with reference to the accompanying drawings. A preferred embodiment is described in the accompanying drawings. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

It will be understood that when an element is referred to as being "fixed" to another element, it can be directly fixed to the other element or intervening elements may be present. Also, when an element is referred to as being "connected" or "coupled" to another element, it can be directly connected or coupled to the other element or intervening elements may be present. As used herein, the terms "vertical", "horizontal", "left", "right" and the like are merely for the illustrative purpose.

Unless otherwise defined, all terms (including technical and scientific terms) used herein have the same meaning as commonly understood by one of ordinary skill in the art to which this invention belongs. The terms used herein is for the purpose of describing particular embodiments only and is not intended to limit the present disclosure. As used herein, the term "and/or" includes any and all combinations of one or more of the associated listed items.

Figure 1:
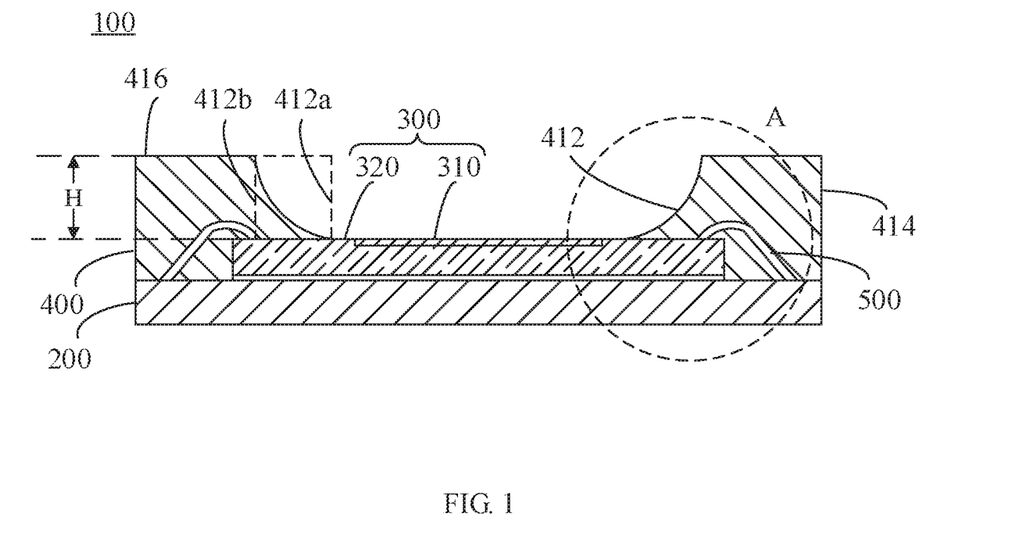
FIG. 1 is a cross-sectional view of a photosensitive assembly according to a first embodiment.
Figure 2:
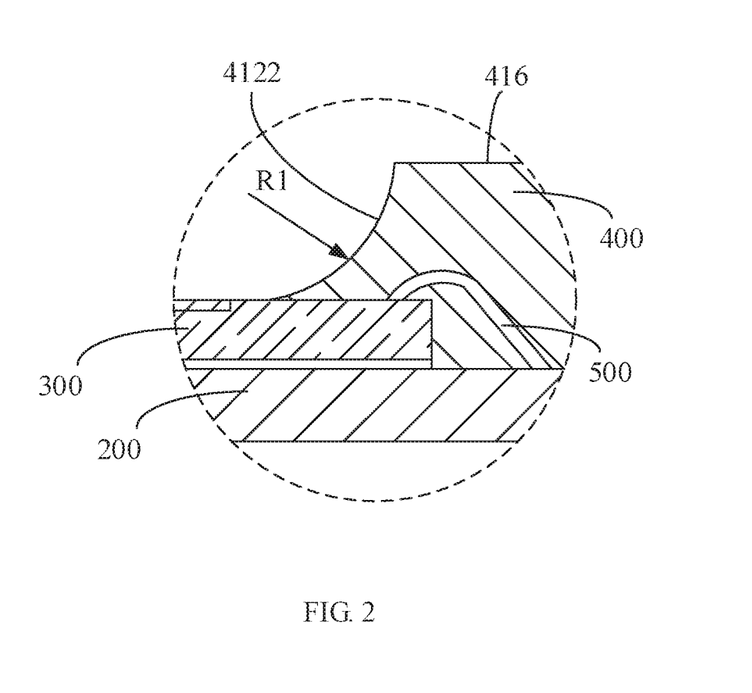
FIG. 2 is an enlarged view of the portion A of FIG. 1.
Figure 3:
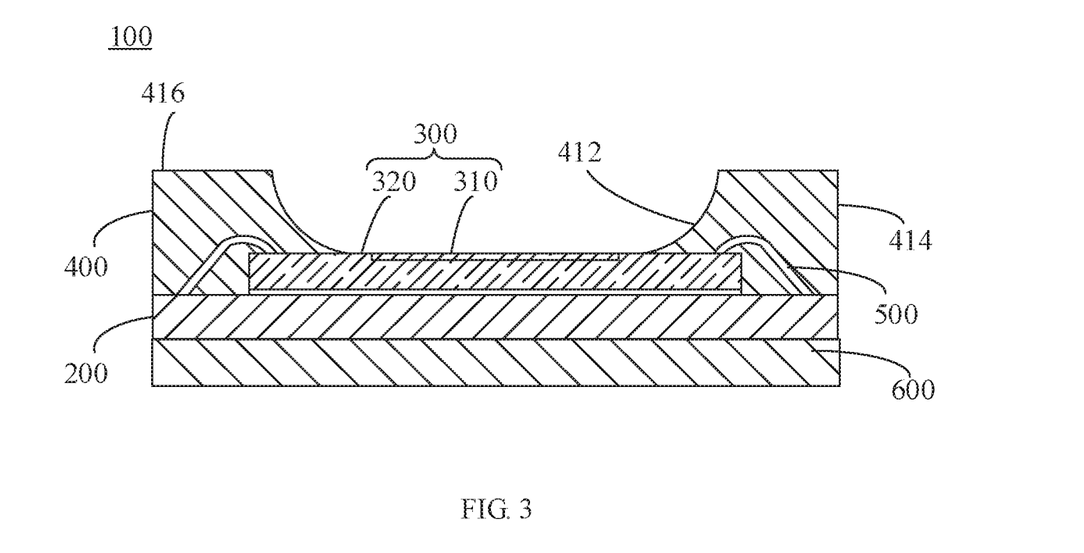
FIG. 3 is a cross-sectional view of a photosensitive assembly according to a second embodiment.

Referring to FIG. 1 and FIG. 2, a photosensitive assembly 100 according to an embodiment includes a circuit board 200, a photosensitive chip 300, and a package body 400. The circuit board 200 can be a rigid circuit board such as a ceramic circuit board, or can be a Flexible Printed Circuit (FPC), or a rigid-flex board. As shown in FIG. 3, when the circuit board 200 is a FPC, a reinforcing board 600 can be provided on a side of the circuit board 200 away from the photosensitive chip 300, so as to enhance the strength of the circuit board 200, and enhance the overall strength of the photosensitive assembly 100.

The photosensitive chip 300 is coupled to a side of the circuit board 200. The photosensitive chip 300 includes a photosensitive area 310 on an upper surface thereof and a non-photosensitive area 320 surrounding the photosensitive area 310. The photosensitive area 310 is mainly made of a semiconductor material with photosensitive characteristics, which will generate a chemical reaction under the exposure of light and further convert light into an electrical signal, thereby achieving photoelectric conversion, and finally completing the camera. While the non-photosensitive area 320 will not generate a chemical reaction under the exposure of the light.

The package body 400 is packaged on the circuit board 200 and covers a portion of the non-photosensitive area 320. In the illustrated embodiment, the non-photosensitive area 320 is partially embedded in the package body 400. Compared with prior art that all of the non-photosensitive area 320 is covered by the package body 400, the amount of the package body 400 is reduced, and a space to receive foreign matter such as packaging resin is reserved. Therefore, during the packaging process, the risk of affecting the camera quality caused by the foreign matter, such as the packaging resin, flowing into the photosensitive area 310 is reduced.

In the photosensitive assembly 100 according to the illustrated embodiment, firstly, since the package body 400 extends onto the photosensitive chip 300, the photosensitive chip 300 is fixed on the circuit board 200 via molding. Therefore, when the package body 400 is formed, the connection between the photosensitive chip 300 and the circuit board 200 is also completed. Thus, the firmness of the connection between the photosensitive chip 300 and the circuit board 200 is enhanced.

Additionally, compared with a conventional package body that is spaced apart from a photosensitive chip, the package body 400 extends onto the photosensitive chip 300. Therefore, the packaging area of the package body 400 is increased, and the firmness of the connection between the package body 400, the circuit board 200, and the photosensitive chip 300 is also enhanced.

Moreover, since the package body 400 extends to the non-photosensitive area 320 of the photosensitive chip 300, the whole photosensitive area 310 can be used to sense light, which ensures that the photosensitive assembly 100 has the largest photosensitive area.

It should be noted that, the package body 300 is packaged on the circuit board 200 and the photosensitive chip 300 via molding. For example, the package body 400 is formed via molding the circuit board 200 and the photosensitive chip 300 via an insert molding process using an injection molding machine. The packaged package body 400 is firmly coupled to the circuit board 200 and the photosensitive chip 300. The adhesion between the package body 400 and the circuit board 200 and the photosensitive chip 300 is much greater than that conventionally bonding by a glue layer. Specifically, a material used to form the package body 400 via the injection molding process can be a nylon, a liquid crystal polymer (LCP), a polypropylene, or the like. However, one skilled in the art will understand that the aforementioned manufacturing methods and materials are merely used to explain specific embodiments of the present disclosure, but are not intended to limit the protection scope of the present disclosure.

In the illustrated embodiment, referring to FIG. 1 and FIG. 2, the package body 400 includes an inner surface 412 and an outer surface 414. The inner surface 412 has a curved surface 4122 on an edge of the inner surface 412 contacting the non-photosensitive area 320. The curved surface 4122 is a concave arc surface. In other words, the curved surface 4122 is recessed towards the outer surface 414.

Referring to FIG. 1, compared with an inner surface 412a (an imaginary inner surface) that perpendicular to the photosensitive chip 300 and passes through an end of the curved surface 4122 in connection with the non-photosensitive area 320, the concave arc surface 4122 can reduce the amount of the material of the package body 400. Meanwhile, compared with an inner surface 412b (an imaginary inner surface) that perpendicular to the photosensitive chip 300 and passes through an end of the curved surface 4122 away from the non-photosensitive area 320, the concave arc surface 4122 can further increase the packaging area of the package body 400, thereby further enhancing the firmness of the connection between the package body 400 and the photosensitive chip 300.

In one of the embodiments, a radius of curvature of the concave arc surface ranges from about 20 μm to about 200 μm. In another embodiment, a radius of curvature of the concave arc surface ranges from about 50 μm to about 150 μm. In yet another embodiment, a radius of curvature of the concave arc surface ranges from about 80 μm to about 120 μm.

The configuration of the radius of curvature R1 of the concave arc surface takes into consideration both the firmness of the connection between the package body 400 and the photosensitive chip 300 and the amount of the material of the package body 400. If R1 is too large, the curved surface 4122 almost coincides with an upper surface of the photosensitive chip 300 away from the circuit board 200. Then the difficulty of molding the package body 400 is increased, and a distance between the curved surface 4122 and the photosensitive area 310 of the photosensitive chip 300 is relatively small. On the other hand, if R1 is too small, the curved surface 4122 is substantially perpendicular to the photosensitive chip 300, and the amount of the material of the package body 400 is not reduced.

Figure 5:
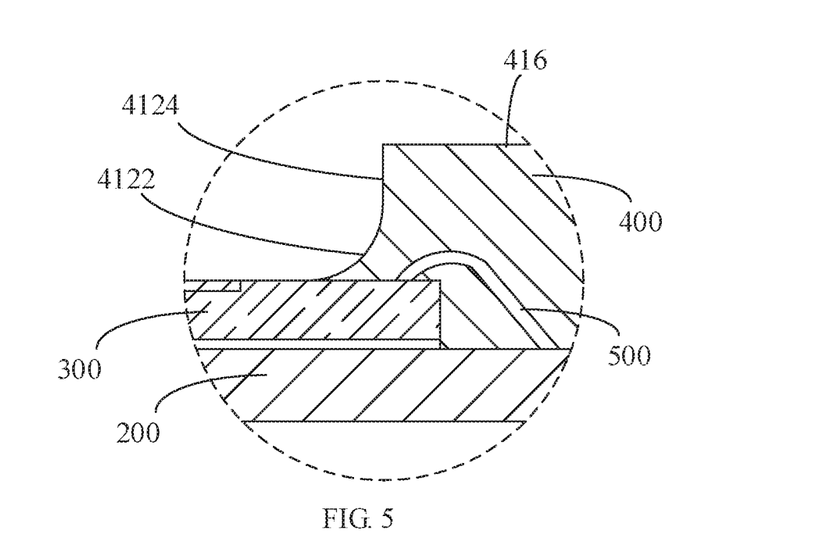
FIG. 5 is an enlarged view of the portion B of FIG. 4.

As shown in FIG. 5, the package body 400 further includes a top surface 416 parallel to the upper surface of the photosensitive chip 300, the top surface 416 connects the inner surface 412 and the outer surface 414. Referring to FIG. 5, the inner surface 412 further has an extending surface 4124 connecting the curved surface 4122 and the top surface 416. The extending surface 4124 can enhance the structural strength of the package body 400.

Figure 4:
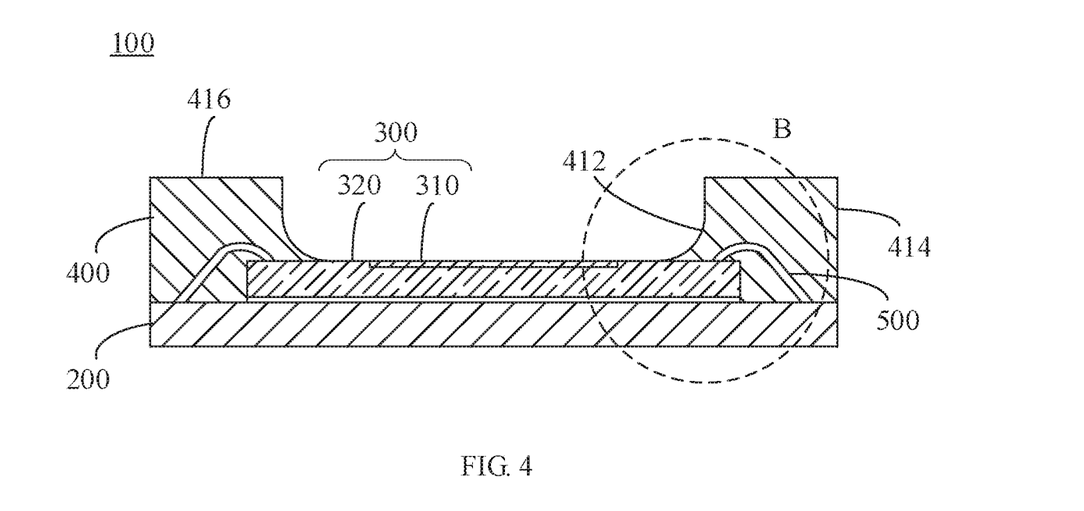
FIG. 4 is a cross-sectional view of a photosensitive assembly according to a third embodiment.

Referring to FIG. 4 and FIG. 5, in one of the embodiments, the extending surface 4124 in perpendicularly connected to the top surface 416. In other words, the extending surface 4124 is perpendicular to the photosensitive chip 300, so as to enhance the structural strength of the package body 400.

Figure 6:
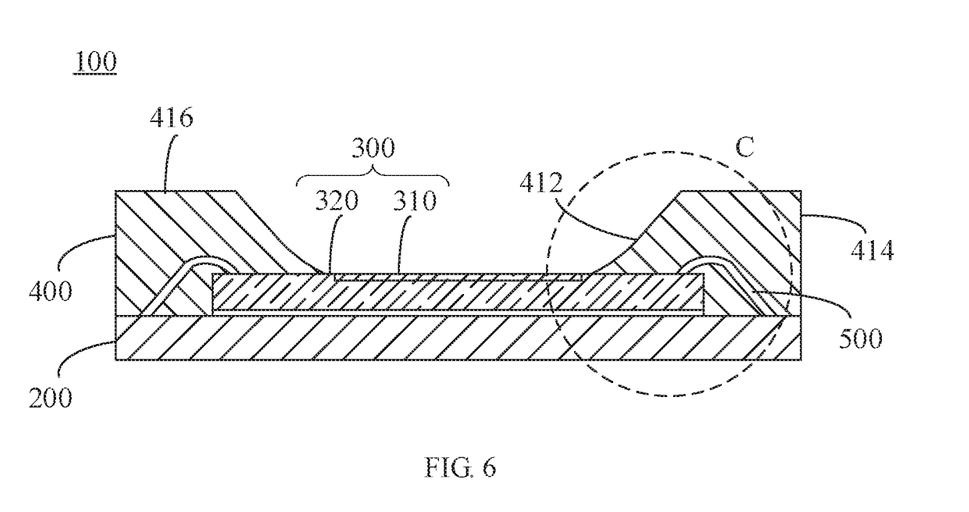
FIG. 6 is a cross-sectional view of a photosensitive assembly according to a fourth embodiment.
Figure 7:
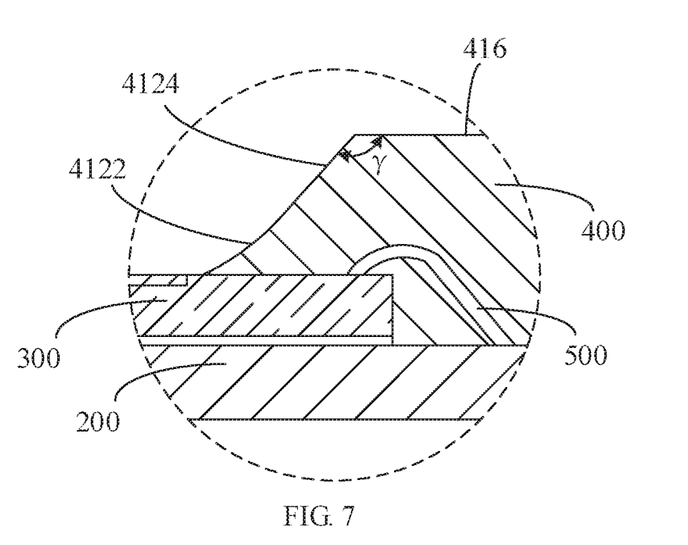
FIG. 7 is an enlarged view of the portion C of FIG. 6.

Referring to FIG. 6 and FIG. 7, in one of the embodiments, the angle γ formed between the extending surface 4124 and the top surface 416 is an obtuse angle. I.e., the extending surface 4124 is inclined toward the outer surface 414. This structure can not only facilitate the demolding of the package body 400, but also can reduce the amount of reflected light reflected from the extending surface 4124 to the photosensitive area 310 of the photosensitive chip 300, thereby avoiding an interference to the camera effect and improving the camera quality.

Figure 8:
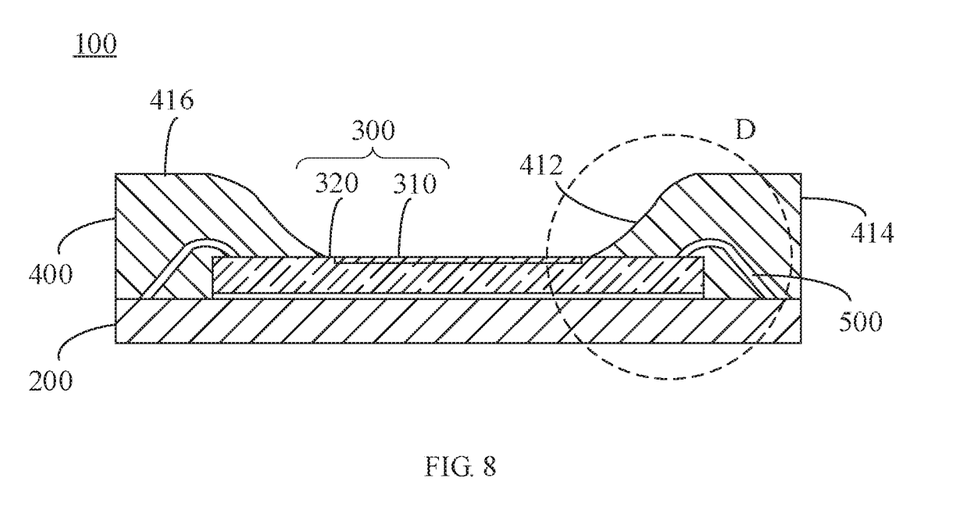
FIG. 8 is a cross-sectional view of a photosensitive assembly according to a fifth embodiment.
Figure 9:
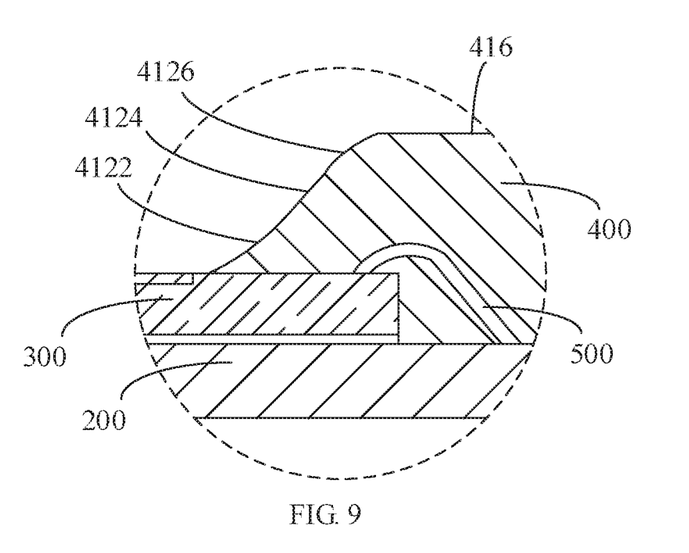
FIG. 9 is an enlarged view of the portion D of FIG. 8.

Additionally, referring to FIG. 8 and FIG. 9, in order to further facilitate the demolding of the package body 400, a convex curved surface (round chamfer) 4126 can be provided on an edge of inner surface 412 contacting the top surface 416. In other words, the convex curved surface 4126 is located between the extending surface 4124 and the top surface 416, such that the convex curved surface 4126 is both smoothly connected to the extending surface 4124 and the top surface 416.

Moreover, the extending surface 4124 is tangential to the curved surface 4122 in all of the embodiments illustrated in FIG. 4 to FIG. 9. In other words, the extending surface 4124 and the curved surface 4122 are smoothly connected, so as to facilitate the demolding of the package body 400 and to avoid damage from the mold to the package body 400 during the demolding process.

In one of the embodiments, referring to FIG. 1, the top surface 416 is parallel to the photosensitive chip 300, and a vertical distance H between the top surface 416 and the upper surface of the photosensitive chip 300 ranges from about 200 μm to about 300 μm. The distance H of the package body 400 with respect to the upper surface of the photosensitive chip 300 should be determined based on two aspects. On the one hand, the distance H should be suitable to form a package for the photosensitive chip 300 or other electrical elements on the circuit board 200, on the other hand, the distance H should not increase the volume of the camera module along a vertical direction. The aforementioned design of the distance H can both satisfy the requirements of packaging and miniaturized design.

In one of the embodiments, the photosensitive assembly 100 further includes a wire 500 connecting the photosensitive chip 300 and the circuit board 200, and the wire 500 is wrapped by the package body 400. In other words, the wire 500 is completely received in the package body 400. The wire 500 can be a golden wire, a copper wire, an aluminum wire, a silver wire or the like. Packaging the wire 500 in the package body 400 can prevent the wire 500 from moving. Meanwhile, since the wire 500 is located in a sealed environment, the contact between the wire 500 and water vapor in the air is reduced, thereby prolonging the service life of the wire 500.

Figure 10:
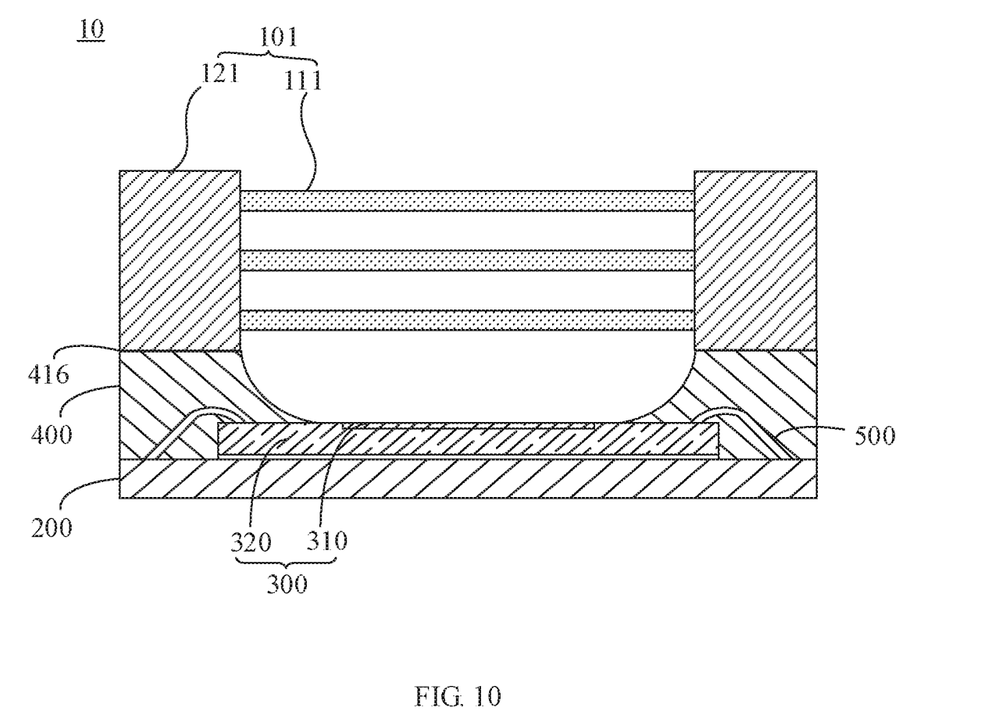
FIG. 10 is a cross-sectional view of a camera module according to an embodiment.

A camera module 10 according to one embodiment is also provided. The camera module 10 includes the aforementioned photosensitive assembly 100 and a lens assembly 101. The lens assembly 101 includes a lens barrel 121 and a lens 111 located in the lens barrel 121. The lens barrel 121 is located on the package body 400 100 and the lens 111 directly faces the photosensitive chip 300.

When a prime lens is required, the lens assembly 101 includes a lens 111 and a lens barrel 121 located on the top surface 416. When a zoom lens is required, the lens assembly 101 includes a lens 111, a lens barrel 121, and a voice coil motor (not shown) sleeved on the lens barrel 121, and the voice coil motor is located on the top surface 416. Lights travel from the lens 111 to the photosensitive area 310 of the photosensitive chip 300, then the photosensitive chip 300 converts the light signal to an electrical signal.

The robustness and reliability of the camera module 10 are enhanced due to the photosensitive assembly 100.

The technical features of the embodiments described above can be arbitrarily combined. In order to make the description succinct, there is no describing of all possible combinations of the various technical features in the foregoing embodiments. It should be noted that there is no contradiction in the combination of these technical features which should be considered as the scope of the description.

Although the present disclosure is illustrated and described herein with reference to specific embodiments, the present disclosure is not intended to be limited to the details shown. It is to be noted that, various modifications may be made in the details within the scope and range of equivalents of the claims and without departing from the present disclosure. Therefore, the protection scope of the present disclosure shall be subject to the protection scope of the claims.

What is claimed is:

1. A photosensitive assembly, comprising:
   a circuit board;
   a photosensitive chip coupled to the circuit board, wherein the photosensitive chip comprises a photosensitive area on an upper surface thereof and a non-photosensitive area surrounding the photosensitive area; and
   a package body packaged on the circuit board and covering a portion of the non-photosensitive area, wherein the package body comprises an inner surface, and the inner surface has a curved surface on an edge thereof contacting the non-photosensitive area;
   wherein the curved surface is a concave curved surface, and the concave curved surface is an arc surface having a radius of curvature ranging from 80 μm to 120 μm;
   wherein the package body further comprises a top surface parallel to the upper surface of the photosensitive chip, the inner surface further has an extending surface connecting the curved surface and the top surface, the extending surface is perpendicular to the top surface, the extending surface is tangential to the curved surface.

2. The photosensitive assembly according to claim 1, wherein the inner surface further has a convex curved surface on an edge thereof contacting the top surface of the package body.

3. The photosensitive assembly according to claim 1, wherein a distance between the top surface and the upper surface of the photosensitive chip ranges from 200 μm to 300 μm.

4. The photosensitive assembly according to claim 1, further comprising a wire connecting the photosensitive chip and the circuit board, wherein the wire is wrapped by the package body.

5. The photosensitive assembly according to claim 1, further comprising a reinforcing board on a side of the circuit board away from the photosensitive chip.

6. A camera module, comprising:
   a photosensitive assembly comprising a circuit board, a photosensitive chip coupled to the circuit board, and a package body packaged on the circuit board; wherein the photosensitive chip comprises a photosensitive area on an upper surface thereof and a non-photosensitive area surrounding the photosensitive area; and the package body comprises an inner surface, and the inner surface has a curved surface on an edge thereof contacting the non-photosensitive area; and
   a lens assembly located on a photosensitive path of the photosensitive chip;
   wherein the curved surface is a concave curved surface, and the concave curved surface is an arc surface having a radius of curvature ranging from 80 μm to 120 μm;
   wherein the package body further comprises a top surface parallel to the upper surface of the photosensitive chip, the inner surface further has an extending surface connecting the curved surface and the top surface; the extending surface is perpendicular to the top surface, the extending surface is tangential to the curved surface.

7. The camera module according to claim 6, wherein the lens assembly comprises a lens barrel located on the package body and a lens located in the lens barrel.

8. The camera module according to claim 6, wherein an angle formed between the extending surface and the top surface is an obtuse angle.

* * * * *